May 2, 1950      P. C. KEITH      2,506,221
CATALYTIC SYNTHESIS OF HYDROCARBONS
Filed Feb. 18, 1947
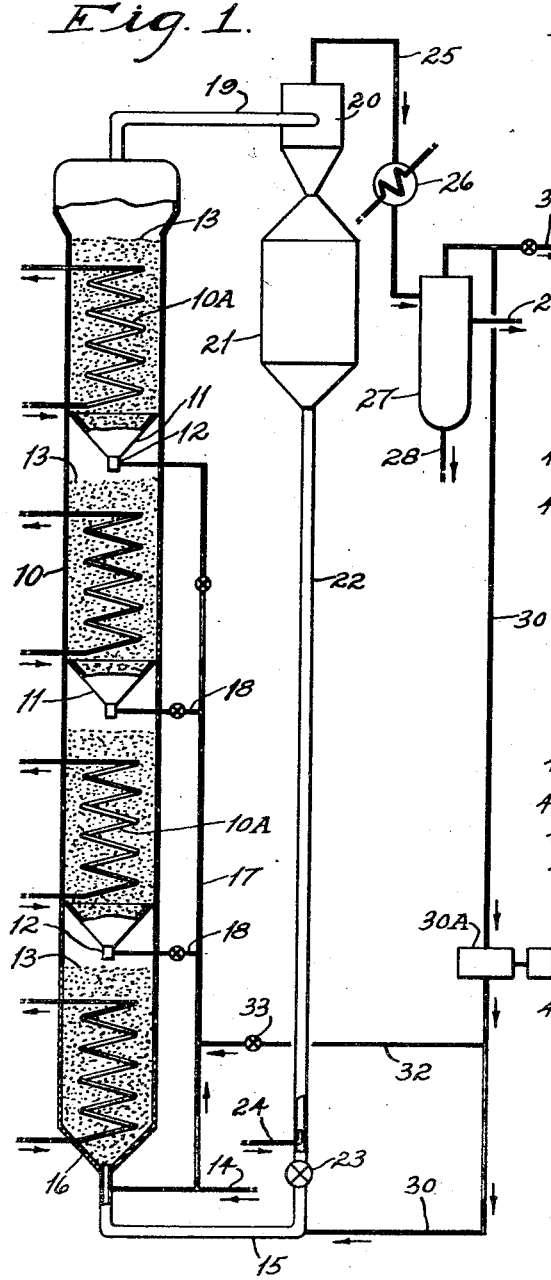
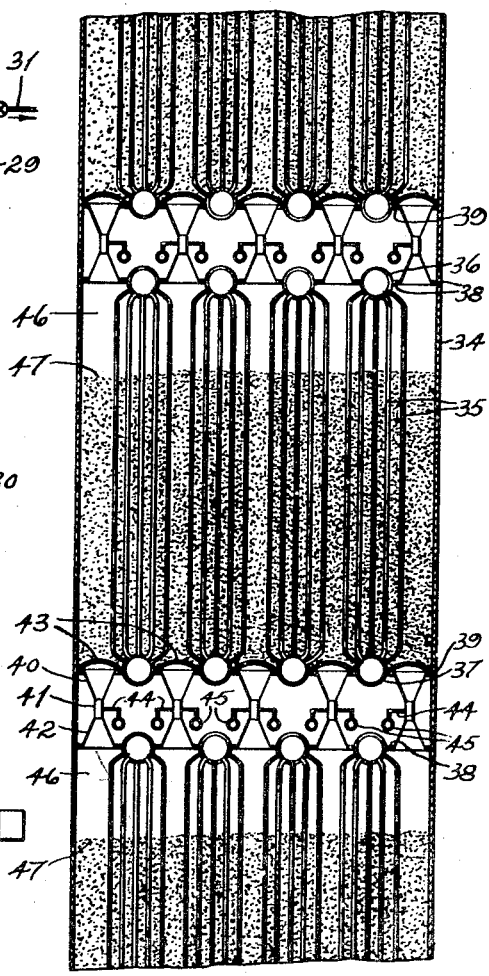
INVENTOR.
PERCIVAL C. KEITH
BY
ATTORNEY Patented May 2, 1950

2,506,221

UNITED STATES PATENT OFFICE 2,506,221

CATALYTIC SYNTHESIS OF HYDROCARBONS

Percival Cleveland Keith, Peapack, N. J., assignor to Hydrocarbon Research, Inc., New York, N. Y., a corporation of New Jersey Application February 18, 1947, Serial No. 729,217

6 Claims. (Cl. 260—449.6)

The present invention relates to the catalytic reduction of carbon oxides with hydrogen resulting in the synthesis of the familiar products of such reduction having a higher molecular weight than carbon monoxide.

The invention more specifically relates to the foregoing synthesis under optimum reaction conditions in the presence of the usual catalysts for this reaction as, for example, the metals of the iron group, particularly iron itself, together with any of the typical activators and promoters. In its preferred embodiment, it particularly concerns the use of the catalyst in the well-known condition of fluidization wherein the individual particles are suspended in an upflow of reactant gases such that the catalyst powder has an apparent density much lower than its normal settled density and the particles vibrate rapidly in all directions while presenting their entire surfaces to the flowing gases. Usually the linear velocity of the stream of gaseous reactants is so adjusted as to maintain such a state of fluidization. However, other gases or purely mechanical means may be depended upon in whole or in part to support this function.

Some difficulty may be experienced in maintaining a uniform condition of fluidization particularly where the catalyst particles have a relatively high density or are relatively large or possess an individual form or shape such that they are difficultly buoyed up or floated in the flow of gases. In a relatively large or deep bed of catalyst the difficulty of maintaining a uniform flow of fluidizing gas throughout the entire mass of the catalyst introduces difficulties in practical operation. This may be evidenced by a tendency for the gas to move upwardly in large bubbles or slugs at certain times and in portions of the reaction zone with an obvious variation from the preselected conditions of contact.

The foregoing disadvantages are enhanced by the fact that the present synthesis reaction involves an overall volume contraction with a corresponding variation in fluid velocities from any preselected optimum.

It has been proposed in connection with fluidized, as well as fixed bed operations, to supply only a portion of the reactant feed gases to the bottom of the reactor, the remainder being introduced at spaced points throughout the reaction zone. This compensates somewhat for the decrease in volume and tends to maintain a more uniform fluid velocity internally thereof. Moreover, it has certain advantages in permitting approach to a more uniform relative proportioning of the reactants throughout the reactor and at the same time distributes the course of the reaction throughout the contact mass as contrasted with many processes wherein the major portion of the reaction may occur, for example, in the lower part of the reactor with corresponding tendency to localize overheating.

The difficulty of introducing successive increments of reactants in uniform admixture with the gaseous flow in the reactor has, however, prevented complete control of the reaction. This disadvantage is made even more unfavorable by the undesired departures from optimum fluidization discussed above.

It is accordingly an object of the present invention to provide for the synthesis of hydrocarbons and/or oxygenated compounds in a catalytic chamber subdivided into a plurality of independent catalyst zones through which a portion of the feed gas is successively passed, preferably in admixture with normally gaseous products recycled from the process, an increment of additional fresh feed gas being introduced and intermingled with the products of each preceding catalyst zone, and the mixed gases being distributed to a succeeding catalyst zone.

Another and somewhat related object contemplates the controlled distribution of the reaction throughout the contact mass with improved control and dissipation of the exothermic heat of reaction and corresponding maintenance of temperatures within the narrow desired optimum range. Overall, the invention overcomes the irregularities of fluidization in deep bed operation and by attainment of the foregoing objectives permits operation under reaction conditions so controlled as to permit synthesis of selected hydrocarbons or other products with substantial suppression of those of undesired composition or boiling point.

In accordance with the present invention, a synthesis gas containing hydrogen and carbon monoxide is introduced into the lower portion of a reactor and passes upwardly through a series of successive, independently supported catalyst masses. The effluent from each preceding catalyst mass is intermingled with an additional increment of reactant gas in an orifice or constricted passage prior to uniform redistribution through the next succeeding bed of catalyst. When so operating and with each mass of catalyst independently supported and in the preferred state of dense phase fluidization, uniform fluidization in each successive zone may be maintained with a predetermined increment of the reaction going forward in each zone and with a corresponding incremental and uniformly distributed liberation of exothermic energy in the entire quantity of catalyst. Each catalyst zone is advantageously separated from the preceding zone not only by a relatively restricted passage, but by suitable means, such as a conical bottom wall concave on its upper surface, adapted to distribute the upward flow of gas uniformly throughout the horizontal cross section of the catalyst mass which it supports. This arrangement assures that the combined streams of gas supplied to each mass of catalyst will initially meet the catalyst in a state of uniform admixture, as contrasted with systems where incrementally added gases are only poorly or partially admixed, or else permitted to "channel" in streams that are not materially admixed at all.

Each catalyst zone is also provided with individual cooling surfaces immersed in the fluidized powder and provided with an internal coolant to maintain the zone at a predetermined uniform operating temperature. The cooling surfaces may take any conventional form, such, for example, as coils or tube bundles preferably of relatively "streamlined" form incapable of impairing good fluidization. With a predetermined increment of the total conversion going forward in each successive zone, it is obvious that the temperature at every point in the reactor may be better controlled by the flow of coolant.

In order to describe the invention in accordance with one preferred embodiment thereof, reference is had to the Figure 1 of the accompanying drawing wherein one preferred arrangement is disclosed more or less diagrammatically. Therein the numeral 10 indicates a vertical tubular reactor divided into a plurality of internal sections by a series of funnel-shaped baffles or partitions composed of frusto-conical walls 11 terminating in a tubular section or orifice 12. The baffles are disposed with their concave surfaces upwardly and the tubular section projecting downwardly. In normal operation, each of the four reaction zones disclosed is provided with a mass of catalyst fluidized by the upflowing reactant gases and has an upper pseudo-liquid level as indicated by the reference numeral 13.

A portion of the synthesis gas, essentially hydrogen and carbon monoxide, is introduced from any suitable source, not shown, through inlet pipe 14 into the catalyst transport conduit 15 which discharges into the lowermost conical portion 16 of the reactor 10. A branch pipe or manifold 17 is connected to inlet pipe 14 and is provided with valve controlled branches 18 which pass into the reactor adjacent each baffle and discharge into each tube or orifice 12 at an intermediate point. By this means, the remainder of the reactant gases is split into several increments which are introduced at spaced points throughout the reactor. Each increment is turbulently intermingled with the gaseous products from the preceding reaction zone to form a uniform admixture which proceeds through the remainder of the reactor successively picking up such additional increments of reactants as may be supplied.

The numeral 10A designates heat exchangers in the form of helical coils immersed within the fluidized powder and supplied with a flow of any suitable coolant such as water, mercury or Dowtherm, at a temperature appropriate to maintain the selected reaction temperature in the turbulent catalyst mass.

The ultimate gasiform reaction products are conducted overhead from the reactor through outlet pipe 19 to a cyclone separator 20 where entrained solid particles are removed from the gases and permitted to gravitate into hopper 21 which is connected with standpipe 22. Catalyst is withdrawn from hopper 21 by way of standpipe 22 and rotary bucket-type valve 23 discharging into transport conduit 15 where the powder is immediately picked up by the inflowing gases from inlet pipe 14 and reconveyed into the reactor. Pipe 24 above valve 23 serves to introduce a gas, say carbon dioxide, to keep the catalyst in standpipe 22 in a free flowing condition.

The gasiform products of reaction leave the separator 20 through pipe 25 and pass through a condenser 26 to a separator 27 from which the water layer is removed as at 28. The liquid hydrocarbon layer is withdrawn by outlet pipe 29 and conveyed to any of the familiar systems for recovery, treatment or use. The normally gaseous stream comprising usually carbon dioxide, gaseous hydrocarbons, possibly some inerts such as nitrogen, and a proportion of hydrogen and carbon monoxide, depending upon the extent to which the reaction has been carried to completion in the reactor 10, passes through pipe 30 for recycle to the lower portion of the reactor 10. Valved branch pipe 31 permits venting of the gasiform stream to maintain the reaction system in balance. Any desired portion of the recycle stream may be introduced into the manifold 17 by way of a branch pipe 32 and valve 33. Recycle gas is made to flow to reactor 10 by means of a pump 30A in line 30. As shown, the recycle gas is injected into catalyst transport line 15 and thus serves to convey catalyst discharged from standpipe 22 back to reactor 10.

In operation, the catalyst particles flow from the lowermost section of reactor 10 through each succeeding section until they leave the reactor by way of pipe 19. While the catalyst particles may be entrained by the gaseous effluent from each fluidized section to the succeeding section thereabove, often the pseudo-liquid level 13 of the fluidized mass in each section will rise until it reaches the orifice 12 of the next upper section. In such case, the catalyst particles may in effect be aspirated into and through the orifice 12 by the gaseous effluent flowing from the lower to the next upper section and by the gaseous reactants injected into orifice 12. Since the same effect takes place in each of the sections, it is apparent that by continual introduction of catalyst through the pipe 15, circulation may be effected upwardly throughout the several sections and downwardly through the standpipe 22. Meanwhile, the gasiform stream passes through each section and through the orifice 12 thereabove under high-velocity, turbulent conditions, and within this orifice fresh reactants are completely mixed with the gasiform stream and the mixture distributed to the succeeding section.

It is well to observe that the process of the invention is advantageously carried out with a relatively high rate of catalyst circulation from the bottom to the top of the reactor and back again to the bottom. As the catalyst is being returned from the top to the bottom of the reactor, it is frequently desirable to subject the catalyst to a stripping or regenerating treatment. Thus, for instance, the catalyst collecting in hopper 21 or any suitable vessel may be fluidized with a stripping gas or vapor, say methane or recycle gas, to remove adsorbed reaction products from the catalyst particles before they are returned to the reactor 10. The maintenance of a high rate of catalyst flow up through reactor 1 is also beneficial in attaining a high rate of heat transfer between the fluidized catalyst and the cooling surfaces disposed in contact therewith.

The present invention may be adapted with advantage in overcoming the familiar tendency of the reactant gases to vary in respect to the relative proportions of hydrogen and carbon monoxide as they pass through the catalyst. Thus it has been observed that ordinarily the gaseous reaction products at any condition of conversion of the reactants possess a materially higher ratio of hydrogen to carbon monoxide than that of the fresh feed. However, when portions of the feed are diverted from the reactor inlet and supplied at succeeding points throughout the reaction zone, they obviously have the effect of lowering this ratio and tending to maintain it in the vicinity of the optimum predetermined level.

The relatively high proportion of hydrogen to carbon monoxide in the recycle stream has the further advantage of permitting operation with a fresh feed synthesis gas of lower hydrogen:carbon monoxide ratio than would be normally economical. For example, where it is desired to supply a total initial inlet feed of, for example, a 2:1 ratio with an available synthesis gas stream in which the $H_2:CO$ ratio is only 1.5:1, the effect can be achieved by proportioning a recycle stream with, for example, an $H_2:CO$ ratio of 3.1 until the total feed possesses the required relative proportion of reactants. Furthermore, in this manner, it is possible to operate at hydrogen:carbon monoxide ratios much higher than 2:1, as, for example, 2½:1, 3:1, or 4:1.

In accordance with one specific example, a system constructed as disclosed in the figure of the drawing is supplied with a powdered iron catalyst finer than 200 mesh, 65% of which passes a 325 mesh screen. The catalyst includes about 2% sodium oxide ($Na_2O$) and about 1½% alumina ($Al_2O_3$). The catalyst is disposed in a series of 4 zones, as disclosed, each about 5 feet in depth and maintained under a good uniform condition of dense phase fluidization at a temperature of 650° F. and a pressure of 240 pounds per square inch gauge, by the upflowing reactants. The lowermost reaction zone is supplied with 25% of the fresh feed gas comprising on the volume basis 65.4% hydrogen and 32.6% carbon monoxide and with a recycle stream roughly equal in volume to the total stream of fresh feed gas entering the reactor. The combined recycle and fresh feed stream entering the lowermost reaction zone has a hydrogen to carbon monoxide ratio of 6.8. At the orifice to each successive reaction zone, another 25% of the gasiform reactant stream is introduced and uniformly mixed with the gaseous effluent rising from the adjoining lower zone. Contact time is about 5 seconds in each zone. The temperature within the successive reaction zones is maintained within 5° F. plus or minus of the selected temperature of 650° F. while good fluidization is attained throughout all parts of each reaction zone. The recycle stream mentioned above is derived from the effluent of the last reaction zone by condensing and separating the normally liquid components. Under the above conditions, the condensed liquid hydrocarbons ($C_3$ and higher) recovered amount to about 85% on the basis of the carbon monoxide converted in the system. The remainder of the converted carbon monoxide is in the form of carbon dioxide (5%) and gaseous hydrocarbons (10%). Without any treatment, the hydrocarbons boiling in the gasoline range by themselves correspond to 50% of the consumed carbon monoxide. By treating the reaction products, for instance, deoxygenating the oxygenated hydrocarbons and polymerizing the unsaturated $C_3$ and $C_4$ hydrocarbons, the gasoline fraction will then correspond to about 75% of the converted carbon monoxide.

In the foregoing example, the gases flowing through the reactor entrain a quantity of catalyst equivalent to five complete changes of catalyst hourly.

Figure 2 of the drawing is a vertical section taken centrally through a portion of a somewhat modified type of reactor embodying the principles of the present invention as applied to contact masses of substantial horizontal cross-section. As shown in Figure 2, the embodiment comprises a tower 34 which may be cylindrical in form and composed of a series of sections duplicating that shown. Each section or catalyst zone contains a separately supported mass of catalyst disposed about nests of vertically extending heat exchange tubes 35. Each of the tubes merges at its extremities with an upper steam header 36 and a lower water header 37, respectively. The tubes 35 present adequate heat exchange surfaces to the catalyst so that the reaction temperature can be maintained uniformly within narrow operating limits.

The headers 36 and 37 are arranged on parallel axes transversely across the tower and normal to the plane of the drawing, and provided with vertically extending cooling tubes substantially throughout their longitudinal dimension so that cooling surfaces are more or less uniformly disposed throughout each catalyst zone.

The headers 36 and 37 are mounted in horizontal partitions 38 and 39, as shown, the sheet 39 receiving the lower or water headers 37 and the sheet 38 receiving the upper or steam headers 36. The space between partition 38 of one section and partition 39 of the next upper section is provided with a multiplicity of closely disposed venturi constructions. These venturi-like elements establish communication between contiguous sections of the reaction tower 34. Each of these connecting elements which are more or less uniformly distributed in the horizontal spaces between the parallel headers consists of an upwardly concave conical section 40, an intermediate throat or tubular section 41 forming a constricted orifice, and the lower downwardly concave conical section 42. The opening at the top of each conical section 40 may be covered, if desired, by a screen 43 adapted to prevent rapid flow-back of catalyst powder in the event that the gas flow is accidentally interrupted.

It will be apparent from the foregoing that in operation the gaseous reaction effluent from each preceding catalyst mass accumulates in the space 46 above the pseudo-liquid level or surface 47 of that catalyst mass and passes through the conical portions 42 into the orifices or tubes 41 at a relatively high velocity and in a condition of substantial turbulence. Therein, streams of fresh feed synthesis gas are introduced through inlet tubes 44 supplied by headers 45 suitably connected to any convenient source of synthesis gas by further connecting pipes and headers, not shown. The turbulently intermingled streams continue upwardly and are distributed uniformly by way of the conical sections 40 to the lower portion of the succeeding catalyst mass.

The foregoing arrangement is obviously well adapted to use with catalyst masses in a state of dense phase fluidization where the total gaseous feed to each mass of catalyst is uniformly distributed, in well mixed condition, across the entire bottom of the mass.

The headers 37 are supplied with a stream of water or other suitable coolant which passes upwardly in tubes 35 to maintain the catalyst at the predetermined temperature level while the generated steam is collected in the headers 36. The piping required for handling the flow of coolant, as well as the fresh feed reactants to each stage or section may pass through the otherwise unoccupied space between the partitions 38 and 39 of contiguous sections and the venturi or orifice members connecting these partitions.

While reference has been made above to specific iron catalysts, the invention is not so limited but contemplates any of the familiar catalysts for this reaction, including, for example, cobalt, nickel or ruthenium, either as particles of the respective metals or carried upon a suitable support, such as diatomaceous earth, silica gel and the like. The catalyst may include any of the typical promoters or activators, such as thoria, zirconia, the alkali metal or alkaline earth metal oxides and numerous others. It will, of course, be understood that the apparatus referred to for purposes of illustration may be varied widely in form and arrangement. Thus, for example, the cyclone separator may be substituted by any suitable means for removing entrained solid particles from the effluent gases. Magnetic and electrostatic separators are obviously equivalent for the purpose, as well as filters and liquid-scrubbing devices.

Reference herein to hydrocarbons is intended to include not only hydrocarbons but other familiar oxygen-containing products of the present reaction such as alcohols, aldehydes, etc., sometimes referred to herein as oxygenated hydrocarbons or compounds. The conditions of temperature, pressure and the like optimum for the preferential production of any selected member of this group of products are well known in the art and, per se, form no part of the present invention. That is to say, the present process and apparatus are equally applicable to any typical operating conditions known to favor the formation of selected products.

Obviously, many modifications and variations of the invention as hereinbefore set forth may be made without departing from the spirit and scope thereof and only such limitations should be imposed as are indicated in the following claims.

I claim:

1. In the process of effecting the conversion of reactant gases comprising hydrogen and carbon monoxide into hydrocarbons, oxygenated hydrocarbons and mixtures thereof by contact with a powdered, solid particle, hydrocarbon synthesis catalyst wherein reactants flow upwardly through a vertically extending tower containing a dense fluid phase of said catalyst particles, and additional reactant is continuously injected into the fluid phase at a plurality of vertically spaced points along the path of upward flow, disposing said catalyst within a plurality of vertically spaced reaction zones, arranged vertically one above the other in said tower, and each being separated from vertically contiguous reaction zones by an intermediate, restricted flow space having a cross-sectional area relatively small compared with that of the tower, introducing a stream of reactant feed gas to the bottom portion of said tower, introducing additional reactant feed gas into each of said restricted flow spaces, passing substantially the entire stream of effluent reactant gases from each preceding reaction zone through the succeeding restricted flow space into the following reaction zone, maintaining movement of reactant gases through each restricted flow space in the velocity range at which highly turbulent flow prevails with relatively decreased flow velocity in each reaction zone effective to maintain the included catalyst in a dense fluid phase, withdrawing the effluent product stream from the final reaction zone and recovering desired products of reaction therefrom.

2. The process according to claim 1 wherein normally gaseous constituents of the effluent product stream are continuously recycled through said reaction zones.

3. The process according to claim 1 wherein the rate of reactant gas flow through each restricted flow space is substantially above the settling rate of the catalyst particles such that the mass of catalyst in the above reaction zone is independently supported without substantial gravitation through the flow space.

4. The process according to claim 1 wherein the mixture of reactant gases flowing from each restricted flow space is substantially uniformly distributed to the lower portion of the succeeding reaction zone.

5. The process according to claim 1 wherein the restricted flow spaces comprise orifices situated between adjacent, superimposed reaction zones, and the reactant flow therethrough is such as to prevent substantial gravitation of catalyst particles.

6. The process according to claim 1 wherein the mass of catalyst in each reaction zone is maintained in dense fluid phase condition with an upper pseudo-liquid surface, from which the effluent reactants disengage, at a point spaced substantially below the succeeding restricted flow space.

PERCIVAL CLEVELAND KEITH.

REFERENCES CITED

The following references are of record in the file of this patent:

UNITED STATES PATENTS

| Number | Name | Date |
| --- | --- | --- |
| 1,711,856 | Prudhomme | May 7, 1929 |
| 1,847,239 | Frey et al. | Mar. 1, 1932 |
| 2,327,489 | Becker | Aug. 24, 1943 |
| 2,367,281 | Johnson | Jan. 16, 1945 |
| 2,379,408 | Arveson | July 3, 1945 |
| 2,393,909 | Johnson | Jan. 29, 1946 |
| 2,417,164 | Huber, Jr. | Mar. 11, 1947 |
| 2,420,632 | Tyson | May 13, 1947 |
| 2,463,912 | Scharmann | Mar. 8, 1949 |